(12) United States Patent
Lin et al.

(10) Patent No.: US 12,310,416 B2
(45) Date of Patent: May 27, 2025

(54) ELECTRONIC CIGARETTE HAVING ELECTRONIC CHILD LOCK AND CONTROLLING METHOD THEREOF

(71) Applicant: HUIZHOU HAPPY VAPING TECHNOLOGY LIMITED, Guangdong (CN)

(72) Inventors: Guangrong Lin, Guangdong (CN); Xianbin Zheng, Guangdong (CN); Xiyong Zhang, Guangdong (CN)

(73) Assignee: HUIZHOU HAPPY VAPING TECHNOLOGY LIMITED, Huizhou (CN)

( * ) Notice: Subject to any disclaimer, the term of this patent is extended or adjusted under 35 U.S.C. 154(b) by 517 days.

(21) Appl. No.: 17/629,402

(22) PCT Filed: Aug. 10, 2020

(86) PCT No.: PCT/CN2020/108080
§ 371 (c)(1),
(2) Date: Jan. 23, 2022

(87) PCT Pub. No.: WO2021/036765
PCT Pub. Date: Mar. 4, 2021

(65) Prior Publication Data
US 2022/0256928 A1    Aug. 18, 2022

(30) Foreign Application Priority Data

Aug. 30, 2019   (CN) .......................... 201910816698.7

(51) Int. Cl.
*A24F 40/53*    (2020.01)
*A24F 40/10*    (2020.01)
(Continued)

(52) U.S. Cl.
CPC .............. *A24F 40/53* (2020.01); *A24F 40/10* (2020.01); *A24F 40/49* (2020.01); *A24F 40/51* (2020.01);
(Continued)

(58) Field of Classification Search
None
See application file for complete search history.

(56) References Cited

U.S. PATENT DOCUMENTS

| | | | |
|---|---|---|---|
| 2016/0206002 A1* | 7/2016 | Borkovec | H01M 50/247 |
| 2019/0158938 A1* | 5/2019 | Bowen | A61M 15/06 |

FOREIGN PATENT DOCUMENTS

| | | | |
|---|---|---|---|
| CN | 106408314 A | * | 2/2017 |
| CN | 107822208 A | | 3/2018 |

(Continued)

OTHER PUBLICATIONS

International Search Report of PCT Patent Application No. PCT/CN2020/108080 issued on Nov. 3, 2020.

*Primary Examiner* — Michael J Felton
*Assistant Examiner* — Dang Q Pham

(57) ABSTRACT

The disclosure provides an electronic cigarette having an electronic child lock and a control method thereof. The electronic cigarette comprises a vaporizer, a battery assembly, and an electronic child lock for controlling power-on and power-off of the electronic cigarette. The battery assembly comprises a battery and a control circuit board. The electronic child lock comprises a microcontroller, a switching circuit, a readable and writable NFC chip, and an NFC antenna, which are arranged on the control circuit board, and comprises a mobile device having NFC function and installed with an electronic cigarette application program. The application program reads the power-on password preset in the NFC chip and compares it with the power-on password preset in the electronic cigarette application pro- (Continued)

gram. If the power-on password is correct, the microcontroller controls switching on of the switching circuit to perform power-on operation such that the electronic cigarette enters the standby state.

8 Claims, 7 Drawing Sheets

(51) Int. Cl.
*A24F 40/49* (2020.01)
*A24F 40/51* (2020.01)
*A24F 40/60* (2020.01)
*A24F 40/65* (2020.01)
*G07C 9/00* (2020.01)

(52) U.S. Cl.
CPC .............. *A24F 40/60* (2020.01); *A24F 40/65* (2020.01); *G07C 9/00309* (2013.01)

(56) References Cited

FOREIGN PATENT DOCUMENTS

| | | | | |
|---|---|---|---|---|
| CN | 109581937 A | * | 4/2019 | ............. A24F 40/50 |
| CN | 109717519 A | | 5/2019 | |
| CN | 211211441 U | | 8/2020 | |

* cited by examiner

ELECTRONIC CIGARETTE HAVING ELECTRONIC CHILD LOCK AND CONTROLLING METHOD THEREOF

TECHNICAL FIELD

The disclosure relates to the field of electronic cigarettes, more particularly to an electronic cigarette having an electronic child lock and a method of controlling the electronic cigarette having an electronic child lock.

BACKGROUND

It is known that tobacco cigarettes contain tobacco tars which are very harmful to the human body. The electronic cigarettes usually heat the e-cigarette liquid by means of a vaporizing device, to produce vapor for the smoker. Since the e-cigarette liquid does not contain the tobacco tar, the harm to the human body is reduced. Thus, the electronic cigarettes are widely used and gradually replace tobacco cigarettes.

With the rise in popularity of the electronic cigarette, the electronic cigarette is widely available in social lives and general homes. The juveniles those lack self-discipline may use or even overuse the electronic cigarette without knowledge of appropriate method of use, which may be harmful to the health of the juveniles and have an adverse effect on society and family. To avoid such adverse effect, it is necessary to prevent the juveniles from using the electronic cigarette. The existing electronic cigarettes have failed to effectively overcome the problem of how to encrypt the electronic cigarette and provide personal customization.

SUMMARY

Technical Problem

An object of the disclosure is to overcome the above deficiencies and provide an electronic cigarette having an electronic child lock and a controlling method thereof, wherein the electronic cigarette having an electronic child lock may be powered on by using NFC technique and logging in through a mobile device.

Technical Solutions

The disclosure provides a technical solution as follow. An electronic cigarette having an electronic child lock comprises a vaporizer, a battery assembly, and an electronic child lock for controlling power-on and power-off of the electronic cigarette. Herein, the vaporizer comprises a heating element for heating and vaporizing cigarette liquid. The battery assembly comprises a battery and a control circuit board. The electronic child lock comprises a microcontroller, a switching circuit, a readable and writable NFC chip, and an NFC antenna, which are arranged on the control circuit board, and comprises a mobile device having NFC function and installed with an electronic cigarette application program. The electronic cigarette application program, the NFC chip, and the microcontroller are configured as follows. The electronic cigarette application program is configured with a login interface and is configured to read the power-on password preset in the NFC chip and compare the power-on password preset in the NFC chip with the power-on password preset in the electronic cigarette application program when the mobile device is moved close to the NFC antenna in the case that the user is logged in the application program of the mobile device through the login interface. The electronic cigarette application program is configured to send a power-on signal by means of the mobile device if the power-on password is correct. The NFC chip is configured to receive and send the power-on signal to the microcontroller. The microcontroller is configured to control switching on of the switching circuit to perform the power-on operation such that the electronic cigarette enters a standby state, and to control switching off of the switching circuit to perform the power-off operation if a standby time exceeds the preset standby time.

Preferably, the electronic cigarette may be configured in such a manner that, once the NFC chip receives and sends the power-on signal to the microcontroller, the microcontroller randomly generates a new power-on password based on a preset program and sends the new power-on password to the NFC chip, the NFC chip saves and sends the new power-on password to the mobile device, the mobile device saves the new power-on password through the electronic cigarette application program, for use at next time to power on the electronic cigarette.

Preferably, the vaporizer and the battery assembly may be connected in a detachable manner, the control circuit board may be further provided with a vaporizer detection circuit for detecting a resistance value of the heating element to allow the microcontroller to determine whether the vaporizer is connected with the battery assembly or not, and the microcontroller may be configured to control switching on of the switching circuit to perform power-on operation upon the power-on signal only in the case that the vaporizer is connected with the battery assembly.

Preferably, the vaporizer or the battery assembly may be further provided with a trigger switch, and the trigger switch may be a microphone-type automatic air flow switch or a digital pressure switch.

Preferably, the vaporizer or the battery assembly may be provided with a display unit or a vibration alarm unit, and the display unit or the vibration alarm unit may be electrically connected with the microcontroller.

Preferably, the login interface of the electronic cigarette application program may include a digital encryption login interface, or a graphic encryption login interface, or a fingerprint encryption login interface, or an iris encryption login interface, or a face recognition encryption login interface, wherein the digital encryption login interface may be configured to identify the preset digital encryption information, the graphic encryption login interface may be configured to identify the preset graphic encryption information, the fingerprint encryption login interface may be configured to identify the preset fingerprint encryption information, the iris encryption login interface may be configured to identify the preset iris encryption information, and the face recognition encryption login interface may be configured to identify the face encryption information.

Preferably, the microcontroller may include 48 pins, wherein the pin A2 is connected with the power supply signal VDD, meanwhile the pin A2 is connected with the capacitors C8 and C17 which are connected in parallel and then is grounded. The pin B3 is connected with the data signal SDA. The pin B4 is connected with the clock signal SCL. The pin A6 is connected with the first voltage signal R-DET of the heating element. The pin A7 is connected with the power supply signal VDD, and meanwhile it is connected with the capacitor C4 and then is grounded. The pin D6 is connected with the enable signal FD. The pin C2 is connected with the resistance detection enable signal R-DET-EN. The pin B1 is connected with the second voltage signal I-DET (i.e. R-DET1) of the heating element. The pin B2 is connected with the output enable signal PWM-EN. The pin E1 is connected with the power supply signal VDD, and meanwhile it is connected with the capacitor C11 and then is grounded. The pin E2 is connected with the power supply signal VDD, and meanwhile it is connected with the capacitor C9 and then is grounded. In addition, the pins F1, D3, G3, C4, D4, C5, D5, E5 are all grounded.

Preferably, the microcontroller may include 28 pins, wherein the third pin is connected with the power supply signal VDD, the fourth pin is grounded, the eighth pin is connected with the first voltage signal R-DET of the heating element, the nineth pin is connected with the second voltage signal I-DET of the heating element, the fourteenth pin is connected with the resistance detection enable signal R-DET-EN, the twenty-second pin is connected with the output enable signal PWM-EN, the twenty-sixth pin is connected with the enable signal FD, the twenty-seventh pin is connected with the data signal SDA, the twenty-eighth pin is connected with the clock signal SCL.

Preferably, the NFC chip may include 8 pins, wherein the first pin and the eighth pin are respectively connected with two ends of the NFC antenna, the second pin is grounded, the third pin is connected with the clock signal SCL, the fourth pin is connected with the enable signal FD, the fifth pin is connected with the data signal SDA, and meanwhile, the third pin connected with the resistor R18, the fourth pin connected with the resistor R13, and the fifth pin connected with the resistor R14, are connected in common with the power supply signal VDD, the sixth pin and the seventh pin are connected in common with the power supply signal VDD, and are connected in common with the capacitor C18 and then is grounded.

Preferably, the circuit board may have an output detection circuit comprising an MOS transistor Q1 and an MOS transistor Q3 which respectively include eight pins, wherein the first pin, the second pin, the sixth pin, the seventh pin, and the eighth pin are combined and serve as the drain D, the third pin serves as the gate G, the fourth pin and the fifth pin are combined and serve as the source S, the drain D of the MOS transistor Q1 is connected with the output voltage signal PWM-OUT of the heating element, meanwhile the drain D of the MOS transistor Q1 is connected with the resistor R26 and then is connected with the second voltage signal I-DET of the heating element, the second voltage signal I-DET of the heating element is connected with the resistor R16 and the capacitor C21 which are connected in parallel and then is grounded, the drain D of the MOS transistor Q3 is connected with the resistor R30 and then is connected with the first voltage signal R-DET of the heating element, the first voltage signal R-DET of the heating element is connected with the resistor R34 and the capacitor C22 which are connected in parallel and then is grounded, the resistor R25 is further connected between the drain D of the MOS transistor Q1 and the drain D of the MOS transistor Q3, the resistor R22 is connected in series with the gate G and the source S of the MOS transistor Q1, the resistor R29 is connected in series with the gate G and the source S of the MOS transistor Q3, the source S of the MOS transistor Q1 is directly connected with the source S of the MOS transistor Q3 and is further connected with the power supply signal BAT+, the output detection circuit further comprises the transistor Q2-A and the transistor Q2-B, the base B of the transistor Q2-A is connected with the resistor R20 and then is connected with the output enable signal PWM-EN, the emitter E of the transistor Q2-A is grounded, the collector C of the transistor Q2-A is connected with the gate G of the MOS transistor Q1, the base B of the transistor Q2-B is connected with the resistor R28 and then is connected with the resistance detection enable signal R-DET-EN, the emitter E of the transistor Q2-B is grounded, the collector C of the transistor Q2-B is connected with the gate G of the MOS transistor Q3.

The disclosure provides another technical solution as follow. A method of controlling an electronic cigarette having an electronic child lock is provided.

The method comprises steps as follows.

(1) Setting initial relative parameters;
(2) Determining whether the switching circuit is turned off such that the electronic cigarette is in the power-off state or not, if yes, await to go to the step (5); if no, go to next step;
(3) By means of the microcontroller, determining whether the standby time exceeds the preset standby time or not, if yes, go to next step; if no, remain in the standby state;
(4) By means of the microcontroller, controlling switching off of the switching circuit to perform power-off operation, and then going back to the step (2);
(5) Logging in the electronic cigarette application program of the mobile device through the login interface by the user;
(6) Reading the power-on password preset in the NFC chip by the electronic cigarette application program by means of the mobile device moved close to the electronic cigarette;
(7) By the electronic cigarette application program, determining whether the power-on password preset in the electronic cigarette application program is coincide with the power-on password preset in the NFC chip or not, if yes, go to the step (9); if no, go to next step;
(8) Sending out an alarm signal by the electronic cigarette application program and informing the user to use a valid electronic cigarette, and awaiting further user action to go back to the step (6);
(9) Sending the power-on signal by the electronic cigarette application program by means of the mobile device;
(10) By means of the NFC chip of the electronic cigarette, sending received power-on signal to the microcontroller;
(11) By means of the microcontroller, controlling switching on of the switching circuit to perform the power-on operation and allow the electronic cigarette to enter the standby state and go back to the step (3).

Preferably, between the step (10) and the step (11), the method may further comprise steps as follows.

(10.1) By means of the microcontroller, randomly generating a new power-on password based on a preset program and sending the new power-on password to the NFC chip;
(10.2) Saving the new power-on password and sending the new power-on password to the mobile device by means of the NFC chip, and then saving the new power-on password by the electronic cigarette application program by means of the mobile device.

Advantages

The electronic cigarette having an electronic child lock utilizes the merits of NFC, such as information exchange and transfer in close range, high-speed transmission, reliable operation, and low cost. The electronic cigarette achieves the electronic child lock by the NFC chip arranged on the electronic cigarette, the mobile device having NFC function, and the electronic cigarette application program installed on the mobile device. The electronic cigarette application program may identify the power-on password preset in the NFC chip to power on the electronic cigarette. The power-on password may also be a dynamic password which can hardly be cracked even by an adult. Hence, only the user having personal password can login in the electronic cigarette application program, and then the power-on password can be identified by the electronic cigarette application program. In this way, double password protection for power-on operation can be provided, thereby effectively realizing encryption for the electronic cigarette and personal customization, preventing the juveniles from using the electronic cigarette, and avoiding the adverse effect on the health of the juveniles and on society and family. The electronic cigarette of the disclosure, which performs power-on operation by the electronic child lock, effectively realizes encryption for the electronic cigarette and personal customization, prevents the juveniles from using the electronic cigarette, and avoids the adverse effect on society and family.

DETAILED DESCRIPTION OF ILLUSTRATED EMBODIMENTS

Figure 1:
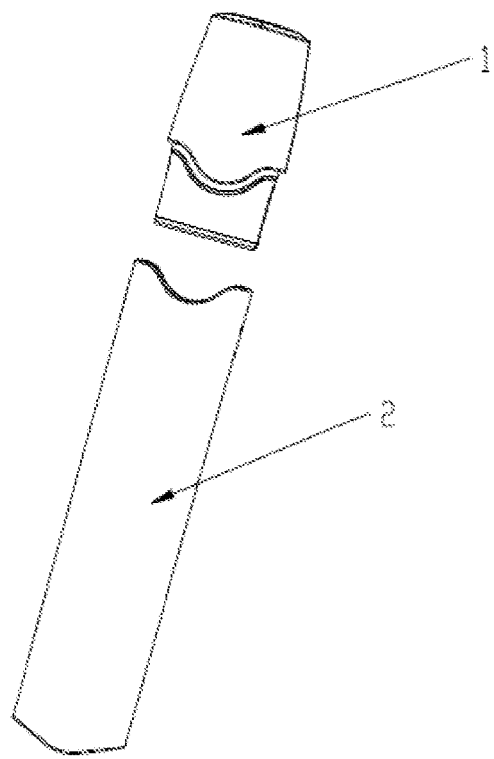
FIG. 1 is a schematic view illustrating an electronic cigarette having an electronic child lock in a disassembled state according to the disclosure.
Figure 2:
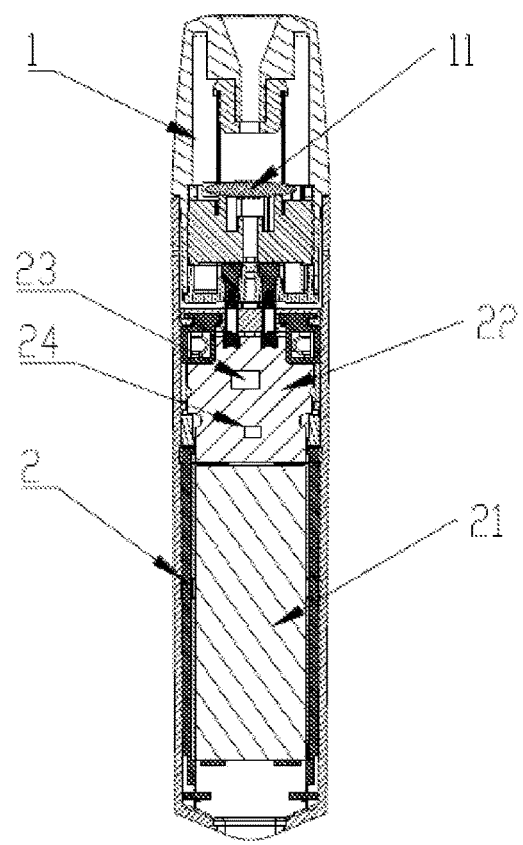
FIG. 2 is a cross-sectional view illustrating an electronic cigarette having an electronic child lock according to the disclosure.

Referring to FIGS. 1 and 2, the disclosure provides an electronic cigarette having an electronic child lock, which comprises a vaporizer 1, a battery assembly 2, and an electronic child lock (not shown in the drawings) for controlling power-on and power-off of the electronic cigarette. Herein, the vaporizer 1 comprises a heating element 11 for heating and vaporizing cigarette liquid. The battery assembly 2 comprises a battery 21 and a control circuit board 22. The electronic child lock comprises a microcontroller 23, a switching circuit (not shown in the drawings), a readable and writable NFC chip 24, and an NFC antenna, which are arranged on the control circuit board 22, and comprises a mobile device having NFC function and installed with an electronic cigarette application program (not shown in the drawings). The electronic cigarette application program, the NFC chip, and the microcontroller are configured as follows.

The electronic cigarette application program is configured with a login interface. The electronic cigarette application program is configured to read the power-on password preset in the NFC chip and compare the power-on password preset in the NFC chip with the power-on password preset in the electronic cigarette application program when the mobile device is moved close to the NFC antenna in the case that the user is logged in the application program of the mobile device through the login interface. The electronic cigarette application program is configured to send a power-on signal or a power-on enable signal by the mobile device if the power-on password is correct. The NFC chip is configured to receive and send the power-on signal or the power-on enable signal to the microcontroller. The microcontroller is configured to control switching on of the switching circuit, to perform or enable power-on operation. When it enables the power-on operation, it is further required to input a power-on command through the electronic cigarette application program. Then, the electronic cigarette may enter a standby state. The microcontroller is configured to control switching off of the switching circuit to perform the power-off operation if a standby time exceeds the preset standby time.

The mobile device having NFC function according to the disclosure may be a laptop, a tablet computer, a smartphone, etc., which has NFC function. The electronic cigarette application program may be a computer program, a smartphone APP, etc. The electronic cigarette having an electronic child lock according to the disclosure can be powered on only in the case that the user is logged in the electronic cigarette application program through the login interface.

After the NFC chip 24 receives and sends the power-on signal to the microcontroller 23, the microcontroller 23 randomly generates a new power-on password based on a preset program and sends it to the NFC chip 24. The NFC chip 24 saves the new power-on password and sends it to the mobile device. Then, through the electronic cigarette application program, the mobile device saves the new power-on password for use at next time to power on the electronic cigarette.

The vaporizer 1 and the battery assembly 2 are connected in a detachable manner. The control circuit board 22 is further provided with a vaporizer detection circuit (not shown in the drawings) for detecting a resistance value of the heating element 11, to allow the microcontroller 23 to determine whether the vaporizer 1 is connected with the battery assembly 2 or not. The microcontroller 23 can control switching on of the switching circuit to perform power-on operation upon the power-on signal only in the case that the vaporizer 1 is connected with the battery assembly 2.

The vaporizer 1 or the battery assembly 2 may be further provided with a trigger switch (not shown in the drawings), and the trigger switch may be a microphone-type automatic air flow switch or a digital pressure switch. When the switching circuit is switched on to power on the electronic cigarette, the electronic cigarette merely enters the standby state. Once the user takes a puff such that an air flow caused by the suction force of the user is generated in the electronic cigarette and triggers the trigger switch, the electronic cigarette starts to work, such that the heating element 11 is energized to heat electronic cigarette liquid and produce electronic cigarette vapor.

The vaporizer 1 or the battery assembly 2 may be further provided with a display unit or a vibration alarm unit (not shown in the drawings), and the display unit or the vibration alarm unit may be electrically connected with the microcontroller, to display working parameters of the electronic cigarette or provide a vibration alarm to inform the user.

The login interface of the electronic cigarette application program may be a digital encryption login interface (not shown in the drawings). In some embodiments, the login interface may also be a graphic encryption login interface, a fingerprint encryption login interface, an iris encryption login interface, or a face recognition encryption login interface (not shown in the drawings). Herein, the digital encryption login interface may be configured to identify the preset digital encryption information, the graphic encryption login interface may be configured to identify the preset graphic encryption information, the fingerprint encryption login interface may be configured to identify the preset fingerprint encryption information, the iris encryption login interface may be configured to identify the preset iris encryption information, and the face recognition encryption login interface may be configured to identify the face encryption information.

Figure 3:
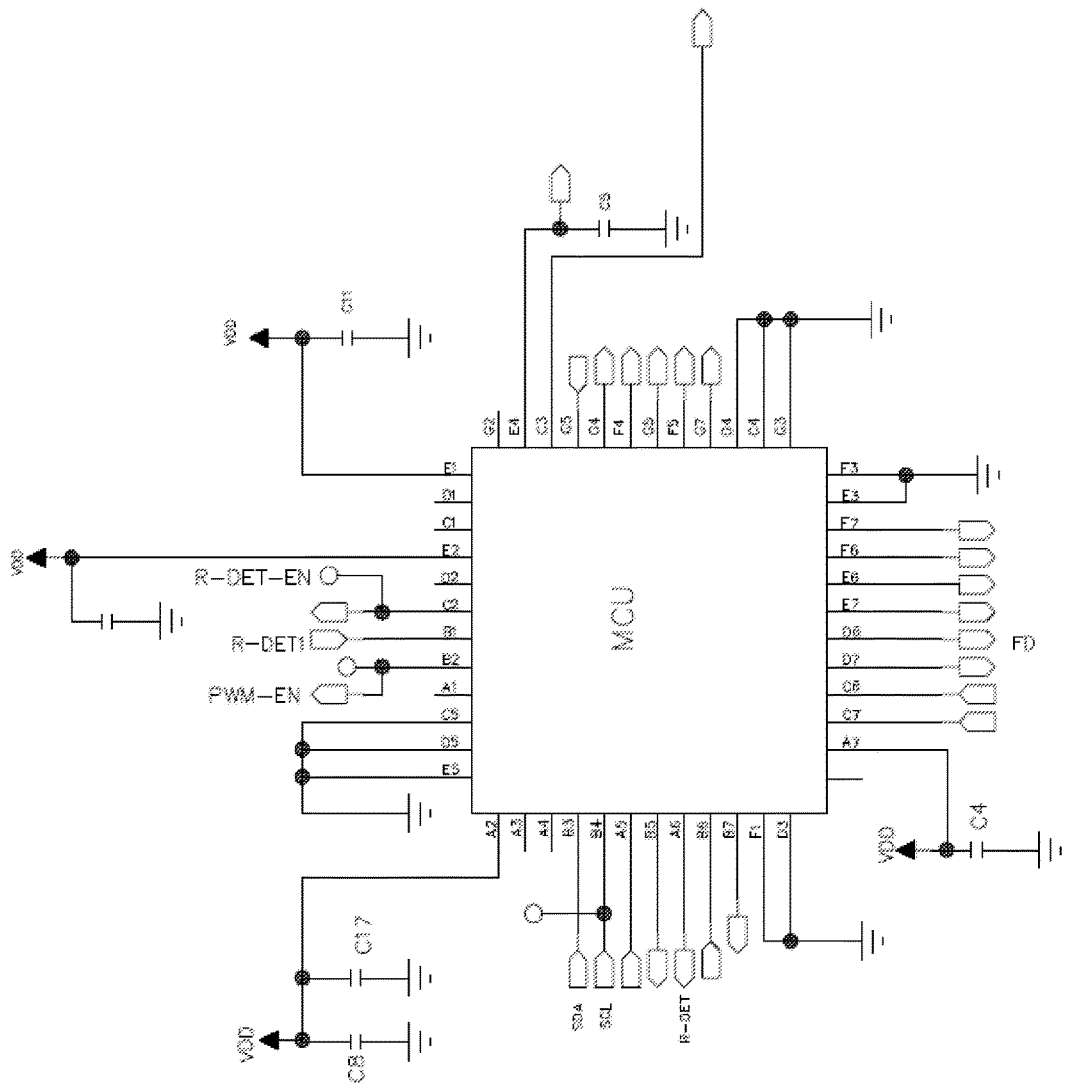
FIG. 3 is a first circuit diagram of a microcontroller of an electronic cigarette having an electronic child lock according to the disclosure.

Referring to FIG. 3, the microcontroller MCU (i.e., the reference sign 23 shown in FIG. 2) in the embodiment includes 48 pins. Herein, the pin A2 is connected with the power supply signal VDD. Meanwhile, the pin A2 is connected with the capacitors C8 and C17 which are connected in parallel and then is grounded. The pin B3 is connected with the data signal SDA. The pin B4 is connected with the clock signal SCL. The pin A6 is connected with the first voltage signal R-DET of the heating element. The pin A7 is connected with the power supply signal VDD, and meanwhile it is connected with the capacitor C4 and then is grounded. The pin D6 is connected with the enable signal FD. The pin C2 is connected with the resistance detection enable signal R-DET-EN. The pin B1 is connected with the second voltage signal I-DET of the heating element. The pin B2 is connected with the output enable signal PWM-EN. The pin E1 is connected with the power supply signal VDD, and meanwhile it is connected with the capacitor C11 and then is grounded. The pin E2 is connected with the power supply signal VDD, and meanwhile it is connected with the capacitor C9 and then is grounded. In addition, the pins F1, D3, G3, C4, D4, C5, D5, E5 are all grounded.

Figure 4:
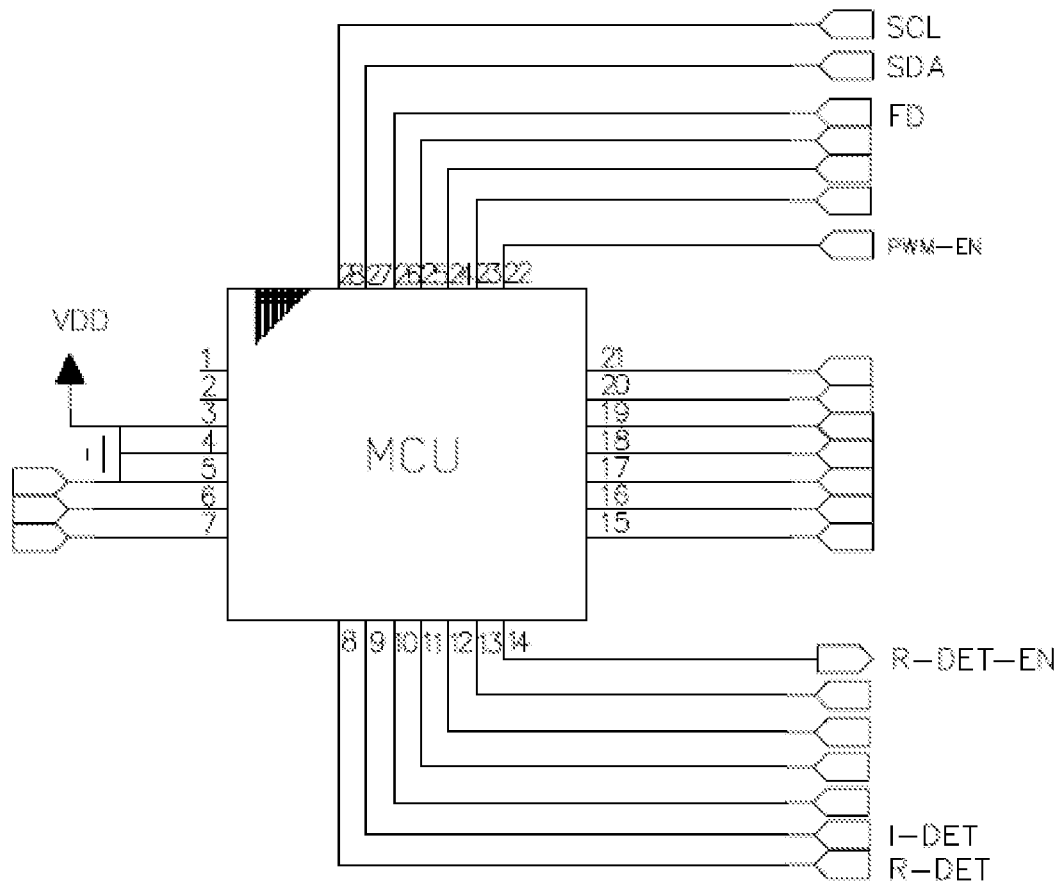
FIG. 4 is a second circuit diagram of a microcontroller of an electronic cigarette having an electronic child lock according to the disclosure.

Referring to FIG. 4, the microcontroller MCU in another embodiment includes 28 pins. Herein, the third pin is connected with the power supply signal VDD. The fourth pin is grounded. The eighth pin is connected with the first voltage signal R-DET of the heating element. The nineth pin is connected with the second voltage signal I-DET of the heating element. The fourteenth pin is connected with the resistance detection enable signal R-DET-EN. The twenty-second pin is connected with the output enable signal PWM-EN. The twenty-sixth pin is connected with the enable signal FD. The twenty-seventh pin is connected with the data signal SDA. The twenty-eighth pin is connected with the clock signal SCL.

Figure 5:
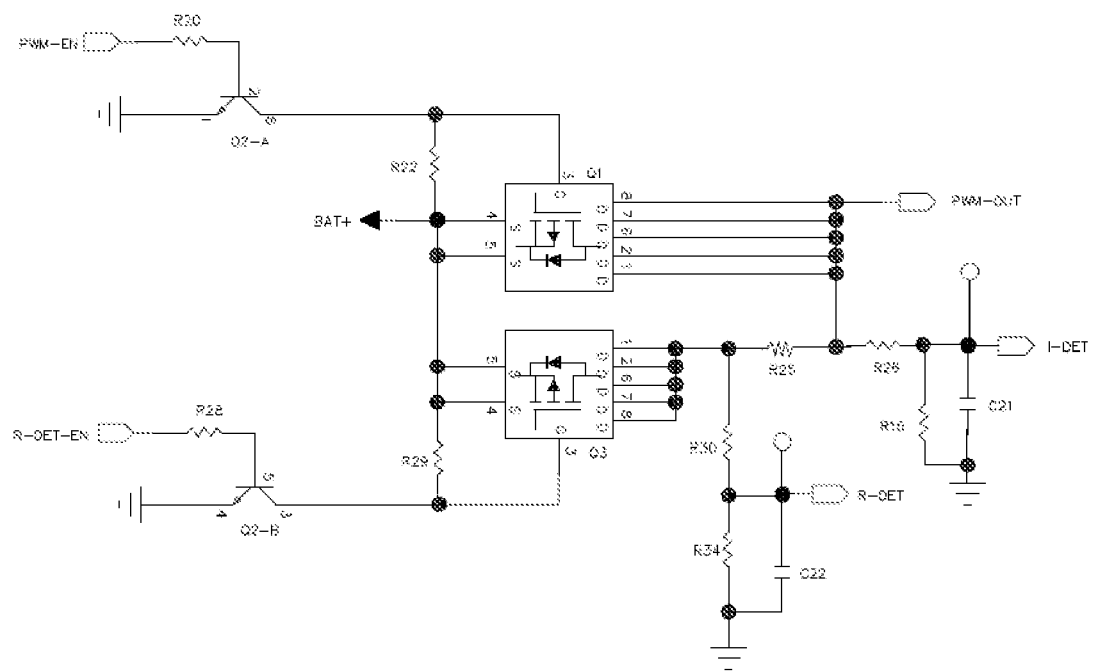
FIG. 5 is an output detection circuit diagram of an electronic cigarette having an electronic child lock according to the disclosure.

Referring to FIG. 5, the circuit board 22 in the embodiment has an output detection circuit comprising an MOS transistor Q1 and an MOS transistor Q3. The MOS transistor Q1 and the MOS transistor Q3 respectively include eight pins. Herein, the first pin, the second pin, the sixth pin, the seventh pin, and the eighth pin are combined and serve as the drain D. The third pin serves as the gate G. The fourth pin and the fifth pin are combined and serve as the source S. The drain D of the MOS transistor Q1 is connected with the output voltage signal PWM-OUT of the heating element. Meanwhile, the drain D of the MOS transistor Q1 is connected with the resistor R26 and then is connected with the second voltage signal I-DET of the heating element. The second voltage signal I-DET of the heating element is connected with the resistor R16 and the capacitor C21 which are connected in parallel and then is grounded. The drain D of the MOS transistor Q3 is connected with the resistor R30 and then is connected with the first voltage signal R-DET of the heating element. The first voltage signal R-DET of the heating element is connected with the resistor R34 and the capacitor C22 which are connected in parallel and then is grounded. Further, the resistor R25 is connected between the drain D of the MOS transistor Q1 and the drain D of the MOS transistor Q3. The resistor R22 is connected in series with the gate G and the source S of the MOS transistor Q1. The resistor R29 is connected in series with the gate G and the source S of the MOS transistor Q3. The source S of the MOS transistor Q1 is directly connected with the source S of the MOS transistor Q3 and is further connected with the power supply signal BAT+. The output detection circuit further includes the transistor Q2-A and the transistor Q2-B. The base B of the transistor Q2-A is connected with the resistor R20 and then is connected with the output enable signal PWM-EN. The emitter E of the transistor Q2-A is grounded. The collector C of the transistor Q2-A is connected with the gate G of the MOS transistor Q1. The base B of the transistor Q2-B is connected with the resistor R28 and then is connected with the resistance detection enable signal R-DET-EN. The emitter E of the transistor Q2-B is grounded. The collector C of the transistor Q2-B is connected with the gate G of the MOS transistor Q3.

Figure 6:
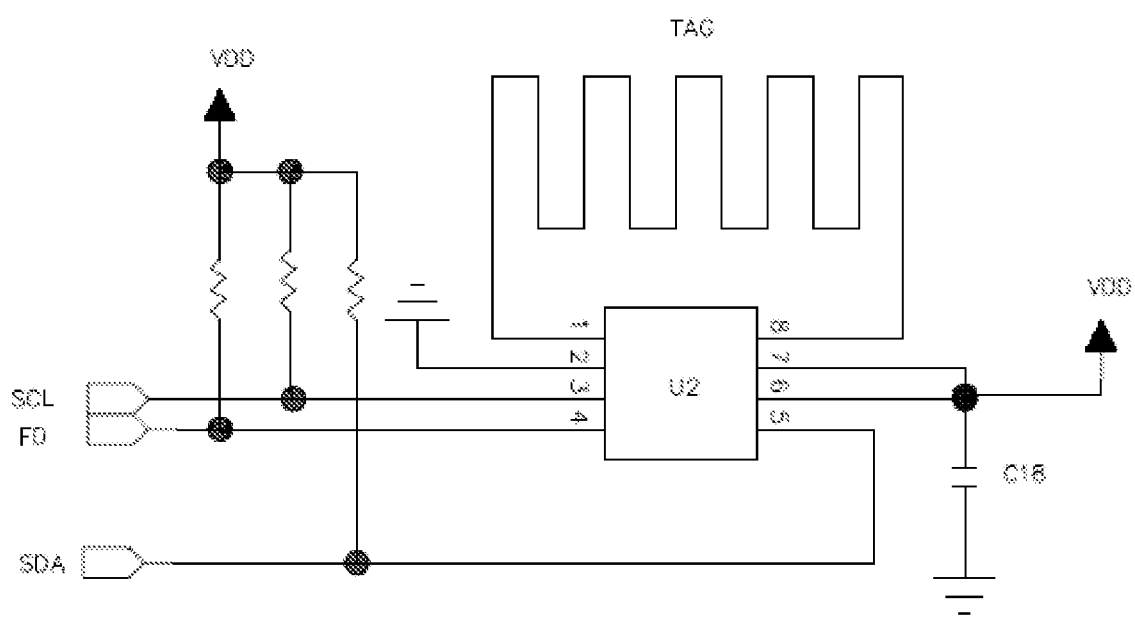
FIG. 6 is a circuit diagram of an NFC chip of an electronic cigarette having an electronic child lock according to the disclosure.

Referring to FIG. 6, the NFC chip U2 in the embodiment includes 8 pins. Herein, the first pin and the eighth pin are respectively connected with two ends of the NFC antenna. The second pin is grounded. The third pin is connected with the clock signal SCL. The fourth pin is connected with the enable signal FD. The fifth pin is connected with the data signal SDA. Meanwhile, the third pin connected with the resistor R18, the fourth pin connected with the resistor R13, and the fifth pin connected with the resistor R14, are connected in common with the power supply signal VDD. The sixth pin and the seventh pin are connected in common with the power supply signal VDD, and are connected in common with the capacitor C18 and then is grounded.

Figure 7:
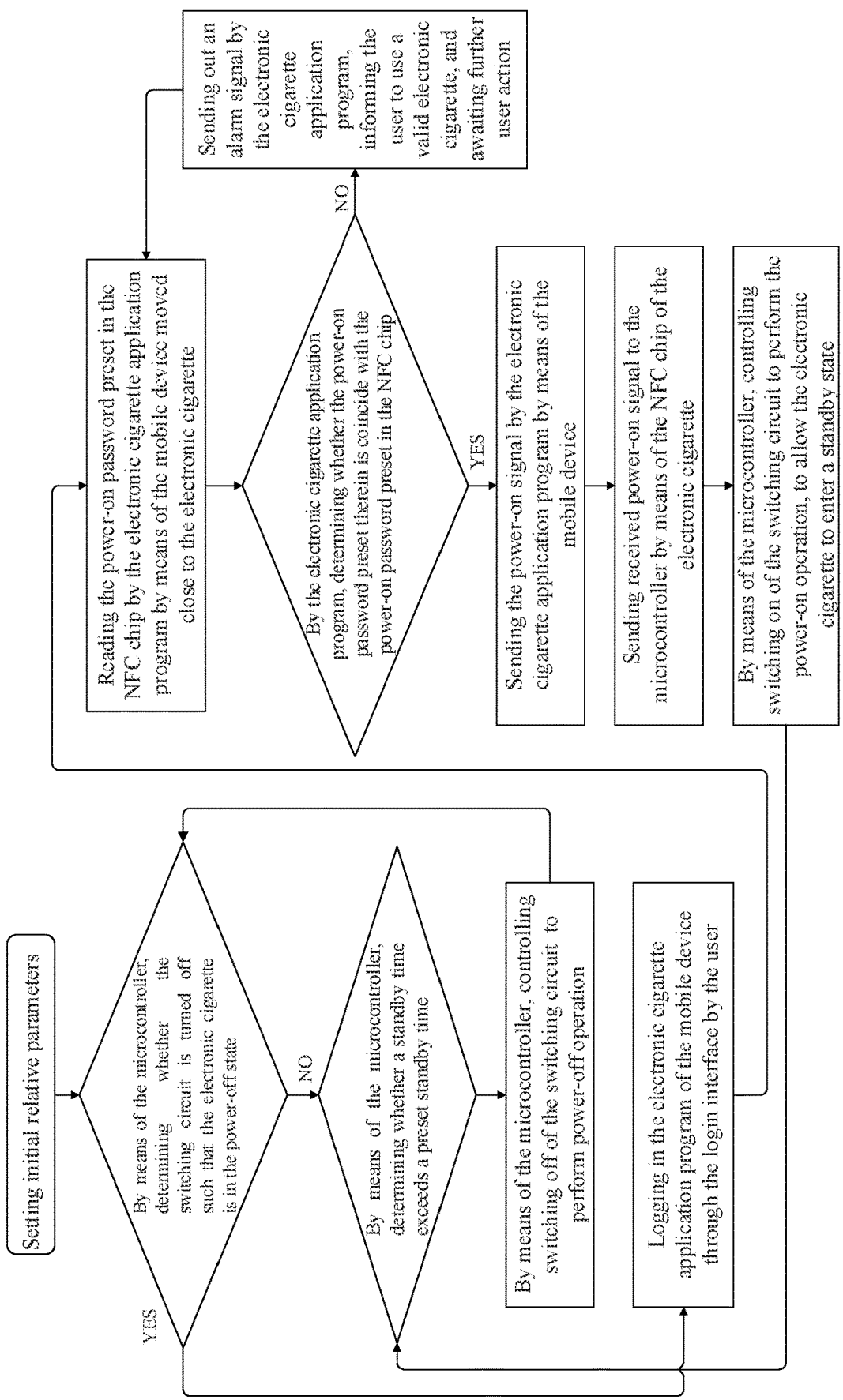
FIG. 7 is a first flowchart illustrating a method of controlling an electronic cigarette having an electronic child lock according to the disclosure.

Referring to FIG. 7, a method of controlling an electronic cigarette having an electronic child lock according to the embodiment comprises steps as follows:

(1) Setting initial relative parameters;
(2) Determining whether the switching circuit is turned off such that the electronic cigarette is in the power-off state or not, if yes, await to go to the step (5); if no, go to next step;
(3) By means of the microcontroller MCU, determining whether the standby time exceeds the preset standby time or not, if yes, go to next step; if no, remain in the standby state;
(4) By means of the microcontroller MCU, controlling switching off of the switching circuit to perform power-off operation, and then going back to the step (2);
(5) Logging in the electronic cigarette application program of the mobile device through the login interface by the user;
(6) Reading the power-on password preset in the NFC chip by the electronic cigarette application program by means of the mobile device moved close to the electronic cigarette;
(7) By the electronic cigarette application program, determining whether the power-on password preset in the electronic cigarette application program is coincide with the power-on password preset in the NFC chip or not, if yes, go to the step (9); if no, go to next step;

(8) Sending out an alarm signal by the electronic cigarette application program and informing the user to use a valid electronic cigarette, and awaiting further user action to go back to the step (6);

(9) Sending the power-on signal or the power-on enable signal by the electronic cigarette application program by means of the mobile device;

(10) Sending received power-on signal or power-on enable signal to the microcontroller by means of the NFC chip of the electronic cigarette;

(11) By means of the microcontroller, controlling switching on of the switching circuit to perform or enable the power-on operation, if the power-on operation is enabled, await for input of a power-on command through the electronic cigarette application program to allow the electronic cigarette to enter a standby state and go back to the step (3).

Figure 8:
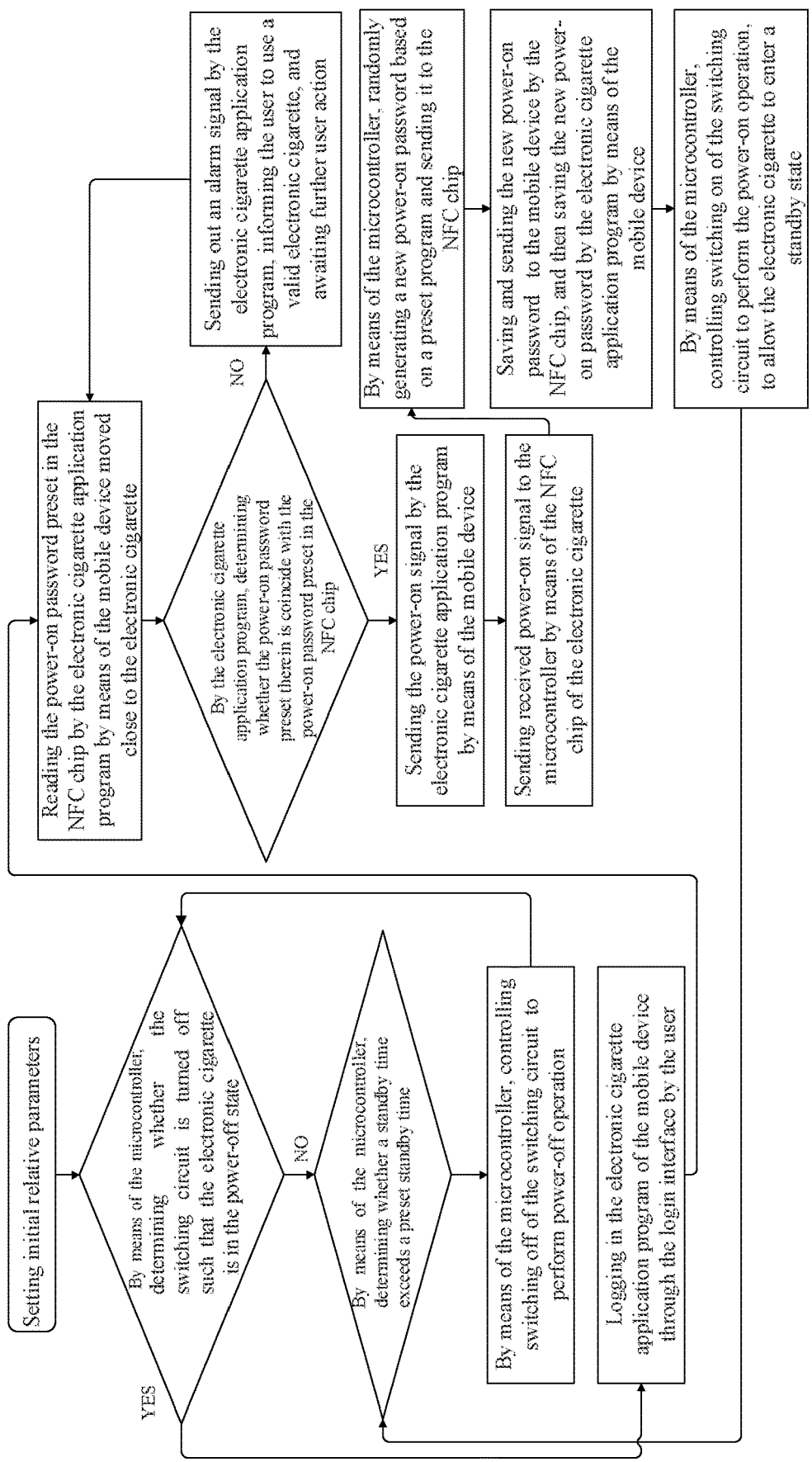
FIG. 8 is a second flowchart illustrating a method of controlling an electronic cigarette having an electronic child lock according to the disclosure.

Referring to FIG. 8, between the step (10) and the step (11) according to the previous embodiment, the method in another embodiment further comprises steps as follows.

(10.1) By means of the microcontroller, randomly generating a new power-on password based on a preset program and sending it to the NFC chip;

(10.2) Saving the new power-on password and sending it to the mobile device by means of the NFC chip, and then saving the new power-on password by the electronic cigarette application program by means of the mobile device.

INDUSTRIAL APPLICABILITY

All the above are merely preferred embodiments of the present invention. The present invention is intended to cover all equivalent arrangements and modifications without departing from the scope of the present invention.

The invention claimed is:

1. An electronic cigarette having an electronic child lock, comprising a vaporizer, a battery assembly, and the electronic child lock for controlling power-on and power-off of the electronic cigarette, wherein the vaporizer comprises a heating element for heating and vaporizing cigarette liquid, the battery assembly comprises a battery and a control circuit board, the electronic child lock comprises a microcontroller, a switching circuit, a readable and writable NFC chip, and an NFC antenna, which are arranged on the control circuit board, and comprises a mobile device having NFC function and installed with an electronic cigarette application program, the electronic cigarette application program, the NFC chip, and the microcontroller are configured in such a manner that, the electronic cigarette application program is configured with a login interface and is configured to read a power-on password preset in the NFC chip and compare the power-on password preset in the NFC chip with a power-on password preset in the electronic cigarette application program when the mobile device is moved close to the NFC antenna in the case that a user is logged in the electronic cigarette application program of the mobile device through the login interface, and the electronic cigarette application program is configured to send a power-on signal by means of the mobile device if the power-on password is correct, the NFC chip is configured to receive and send the power-on signal to the microcontroller, and the microcontroller is configured to control switching on of the switching circuit to perform a power-on operation such that the electronic cigarette enters a standby state, and to control switching off of the switching circuit to perform a power-off operation if a standby time exceeds a preset standby time; wherein the microcontroller includes 28 pins, wherein a third pin is connected with a power supply signal VDD, a fourth pin is grounded, an eighth pin is connected with a first voltage signal R-DET of the heating element, a nineth pin is connected with a second voltage signal I-DET of the heating element, a fourteenth pin is connected with a resistance detection enable signal R-DET-EN, a twenty-second pin is connected with an output enable signal PWM-EN, a twenty-sixth pin is connected with an enable signal FD, a twenty-seventh pin is connected with a data signal SDA, a twenty-eighth pin is connected with a clock signal SCL.

2. The electronic cigarette having an electronic child lock according to claim 1, wherein the electronic cigarette is configured in such a manner that, once the NFC chip receives and sends the power-on signal to the microcontroller, the microcontroller randomly generates a new power-on password based on a preset program and sends the new power-on password to the NFC chip, the NFC chip saves and sends the new power-on password to the mobile device, the mobile device saves the new power-on password through the electronic cigarette application program, for use at next time to power on the electronic cigarette.

3. The electronic cigarette having an electronic child lock according to claim 1, wherein the vaporizer and the battery assembly are connected in a detachable manner, the control circuit board is further provided with a vaporizer detection circuit for detecting a resistance value of the heating element to allow the microcontroller to determine whether the vaporizer is connected with the battery assembly or not, and the microcontroller is configured to control switching on of the switching circuit to perform the power-on operation upon the power-on signal only in the case that the vaporizer is connected with the battery assembly.

4. The electronic cigarette having an electronic child lock according to claim 1, wherein the vaporizer or the battery assembly is further provided with a trigger switch, and the trigger switch is a microphone-type automatic air flow switch or a digital pressure switch.

5. The electronic cigarette having an electronic child lock according to claim 1, wherein the vaporizer or the battery assembly is provided with a display unit or a vibration alarm unit, and the display unit or the vibration alarm unit is electrically connected with the microcontroller.

6. The electronic cigarette having an electronic child lock according to claim 1, wherein the login interface of the electronic cigarette application program includes a digital encryption login interface configured to identify preset digital encryption information, or a graphic encryption login interface configured to identify preset graphic encryption information, or a fingerprint encryption login interface configured to identify preset fingerprint encryption information, or an iris encryption login interface configured to identify preset iris encryption information, or a face recognition encryption login interface configured to identify face encryption information.

7. The electronic cigarette having an electronic child lock according to claim 1, wherein the NFC chip includes 8 pins, wherein a first pin and an eighth pin are respectively connected with two ends of the NFC antenna, a second pin is grounded, a third pin is connected with a clock signal SCL, a fourth pin is connected with an enable signal FD, a fifth pin is connected with a data signal SDA, and meanwhile, the third pin connected with a resistor R18, the fourth pin connected with a resistor R13, and the fifth pin connected with a resistor R14, are connected in common with a power supply signal VDD, a sixth pin and a seventh pin are connected in common with a power supply signal VDD, and are connected in common with a capacitor C18 and then is grounded.

8. The electronic cigarette having an electronic child lock according to claim 1, wherein the circuit board has an output detection circuit comprising an MOS transistor Q1 and an MOS transistor Q3 which respectively include eight pins, wherein a first pin, a second pin, a sixth pin, a seventh pin, and an eighth pin are combined and serve as a drain D, a third pin serves as a gate G, a fourth pin and a fifth pin are combined and serve as a source S, the drain D of the MOS transistor Q1 is connected with an output voltage signal PWM-OUT of the heating element, meanwhile the drain D of the MOS transistor Q1 is connected with a resistor R26 and then is connected with a second voltage signal I-DET of the heating element, the second voltage signal I-DET of the heating element is connected with a resistor R16 and a capacitor C21 which are connected in parallel and then is grounded, the drain D of the MOS transistor Q3 is connected with a resistor R30 and then is connected with a first voltage signal R-DET of the heating element, the first voltage signal R-DET of the heating element is connected with a resistor R34 and a capacitor C22 which are connected in parallel and then is grounded, a resistor R25 is further connected between the drain D of the MOS transistor Q1 and the drain D of the MOS transistor Q3, a resistor R22 is connected in series with the gate G and the source S of the MOS transistor Q1, a resistor R29 is connected in series with the gate G and the source S of the MOS transistor Q3, the source S of the MOS transistor Q1 is directly connected with the source S of the MOS transistor Q3 and is further connected with a power supply signal BAT+; the output detection circuit further comprises a transistor Q2-A and a transistor Q2-B, a base B of the transistor Q2-A is connected with a resistor R20 and then is connected with an output enable signal PWM-EN, an emitter E of the transistor Q2-A is grounded, a collector C of the transistor Q2-A is connected with the gate G of the MOS transistor Q1, a base B of the transistor Q2-B is connected with a resistor R28 and then is connected with a resistance detection enable signal R-DET-EN, an emitter E of the transistor Q2-B is grounded, and a collector C of the transistor Q2-B is connected with the gate G of the MOS transistor Q3.

* * * * *